June 7, 1966 J. B. HUNTER 3,254,956
PRODUCTION OF ULTRA PURE HYDROGEN
Filed March 14, 1963 2 Sheets-Sheet 1
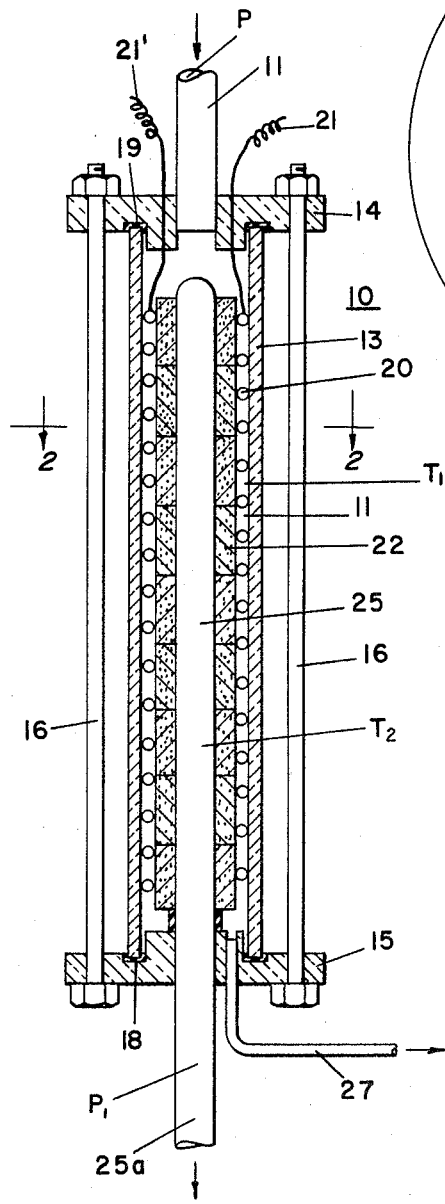
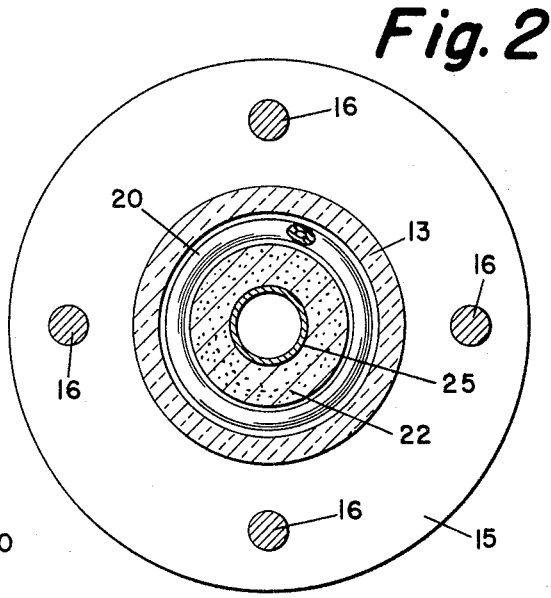
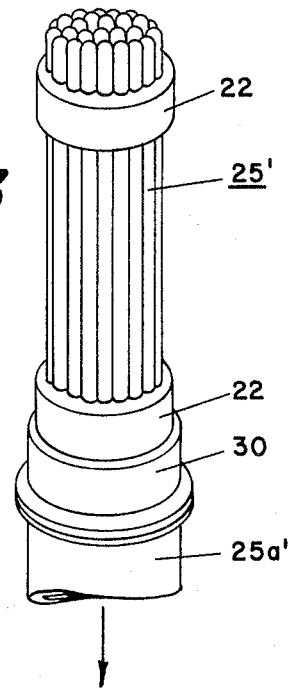

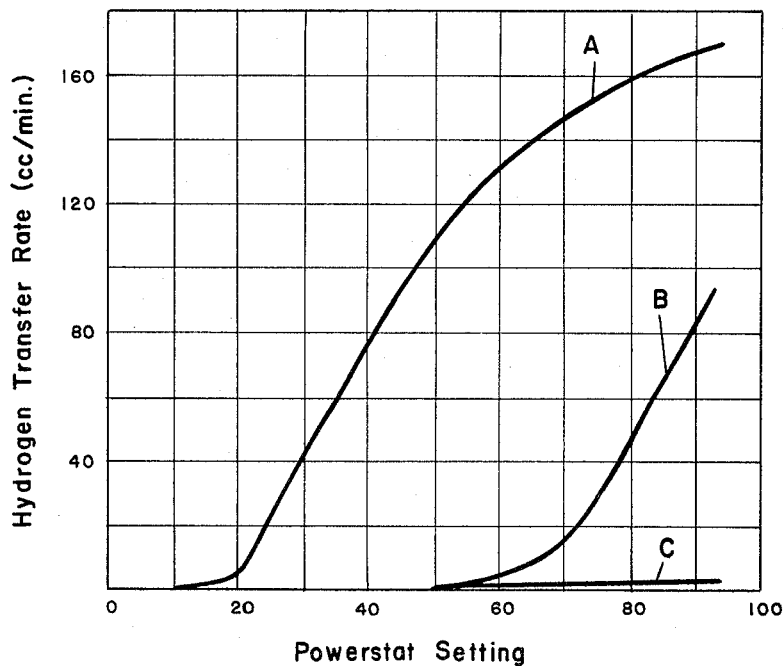

United States Patent Office 3,254,956
Patented June 7, 1966

3,254,956
PRODUCTION OF ULTRA PURE HYDROGEN
James B. Hunter, Newtown Square, Pa., assignor to J. Bishop & Co. Platinum Works, Malvern, Pa., a corporation of Pennsylvania
Filed Mar. 14, 1963, Ser. No. 269,831
9 Claims. (Cl. 23—212)

The present application is a continuation-in-part of application Serial No. 186,013 filed April 9, 1962, now abandoned.

This invention relates to the production of ultra pure hydrogen and has for an object the provision of a method of producing ultra pure hydrogen from a gas or gaseous mixture containing only in part hydrogen atoms physically associated with or chemically bonded to nitrogen such as in gases containing nitrogen and hydrogen or such as ammonia ($NH_3$) or gas mixtures containing carbon wherein the gas molecule contains no more than one carbon atom as in the case of methane, methanol, carbon monoxide or carbon dioxide.

The presence of carbon containing gases wherein the carbon containing molecule is comprised of more than one carbon atom such as in the case of ethane, propane, butane and higher members of the paraffin series or alcohols such as ethanol, propanol and higher members of the alcohol series renders the process inoperable because of surface poisoning of the palladium and/or palladium alloy membrane by the chemisorption of the unsaturated or olefinic compounds resulting from catalytic dehydrogenation. Also the presence of gases containing sulfur atoms must be avoided. In this case, chemical reaction with the palladium or palladium alloy occurs to form metallic sulfides that result in surface poisoning and ultimately in physical deterioration of the metal itself.

One of the common methods of producing hydrogen is the so-called electrolytic process. When a D.C. current is passed through an acidified water electrolyte, hydrogen gas is released at the cathode of the cell and oxygen at the anode. By means of suitable separating diaphragms and piping, these gases may be separately removed from the electrolytic cell and subsequently compressed for the purpose of storage either in large tanks or in individual cylinders. For most purposes, the purity of this hydrogen is satisfactory. There is developing, however, an increasing demand for hydrogen of even greater purity particularly in fields such as transistor manufacture, powdered metal processing and the bright annealing of stainless steels. In these cases, trace amounts of oxygen, water vapor, nitrogen, etc. may not be tolerated and additional processing steps are required for their complete removal. Depending on the specification of the required gas, a portion of the ultra purified material may, at times, be blended back with a given amount of the unpurified product to produce a final blend of an intermediate purity. This procedure allows the production of a given volume of gas conforming to a given purity specification without the additional cost of installing excess purification equipment.

Various methods have heretofore been proposed for producing ultra pure hydrogen, one of the preferred methods being disclosed and claimed in Hunter Patent 2,773,561 in which a silver-palladium film is used for separation and purification of hydrogen. This is best practiced by using a palladium alloy diffusion cell, such for example as the type disclosed in Hunter et al. Patent 2,961,062.

A second method of producing hydrogen gas, that is rapidly becoming more popular, is through the dissociation of gaseous ammonia. From the standpoint of economics, this process has much to recommend it over the electrolytic method of producing hydrogen; however, from the standpoint of hydrogen purity, it leaves much to be desired. Since the chemical formula for ammonia is expressed as $NH_3$, it follows that three atoms of hydrogen are associated with one atom of nitrogen. When ammonia is then completely dissociated, the product of gas contains three volumes of hydrogen for each one volume of nitrogen. The mixture is then expressed as containing 75% $H_2$. When it is required to obtain ultra pure hydrogen from this mixture, the purification step required is considerably more involved and costly than that required for use with the electrolytic product.

In practicing the ammonia dissociation process, it is common to start with a liquid ammonia feed. This is transformed into a gas and introduced into a catalyst chamber heated to a temperature of between 1700° F. and 1800° F. and at a pressure slightly above one atmosphere. The gaseous ammonia is dissociated within the chamber to a 75/25% mixture of $H_2$ and $N_2$, i.e., the gaseous mixture contains 75% $H_2$ by volume and 25% $N_2$ by volume. Because of the increase in gaseous volume from two mols to four mols resulting from this dissociation, the reaction, as shown in the following equation $$2NH_3 \rightarrow 3H_2 + N_2$$ 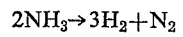

is unfavorably affected by pressure.

If it is desired to utilize the hydrogen-nitrogen mixture at pressures other than slightly above atmospheric, the gas must be passed through a cooler to lower its temperature and then introduced into a compressor. To utilize a palladium alloy diffusion cell as a means of purifying a gaseous mixture of this type from an ammonia dissociator, it is necessary to reheat the compressed gas to an operating temperature of about 800° F. At a pressure differential of about 200 p.s.i.g., as supplied by the compressor, the hydrogen in the gaseous mixture permeates through the palladium alloy film in the cell and is withdrawn as ultra pure hydrogen while the hydrogen depleted gas is removed from a different outlet of the cell, the latter gas containing nitrogen and a relatively small amount of hydrogen.

In accordance with the present invention, the steps of dissociation and diffusion are combined with a single unit and thus there is eliminated the need for an auxiliary compressor as heretofore required. At the same time, the heat input required for dissociation is also available for effecting hydrogen diffusion. By removing the hydrogen from the dissociated gas as rapidly as it is formed on the catalyst, the use of elevated pressure becomes advantageous rather than detrimental. This follows since the removal of the three volumes of hydrogen results in a decrease in the total gaseous volume so that two volumes of ammonia are converted into one volume of nitrogen. The ultra pure hydrogen issuing from the unit can then be removed at elevated pressure since a relatively small pressure drop is required to effect hydrogen diffusion.

More particularly, in accordance with the present invention, there is provided a method of producing ultra pure hydrogen from a gas or gaseous mixture containing only in part hydrogen atoms and no more than one carbon atom per gaseous molecule comprising the steps of catalytically dissociating the gas or gaseous mixture into a mixture containing hydrogen as a separate component, continuously removing the hydrogen as rapidly as it is formed, and withdrawing the residual component of the original gas or gaseous mixture in a form substantially free of hydrogen.

Further in accordance with the present invention there is provided a method of producing ultra pure hydrogen from a gas or gaseous mixture substantially free of sulfur atoms and containing only in part hydrogen atoms and no more than one carbon atom per gaseous molecule comprising the steps of introducing the heated gas or gaseous mixture into a palladium alloy diffusion cell forming a zone containing a heated catalytic surface on which the gas is dissociated into a mixture containing hydrogen as a separate component, continuously removing the hydrogen substantially as rapidly as it is formed during the passage of the gas through the palladium alloy of the cell, and withdrawing the residual component of the original gas in a form substantially depleted of hydrogen.

For further objects and advantages of the invention and for a detailed description thereof, reference is to be had to the following description taken in conjunction with the accompanying drawings in which:

FIG. 1 is a sectional view of a palladium alloy diffusion cell useful in producing ultra pure hydrogen in accordance with the present invention;

FIG. 2 is a sectional view on enlarged scale taken along the lines 2—2 of FIG. 1;

FIG. 3 is a fractional perspective view on enlarged scale showing a modification of the palladium alloy tube of FIG. 1; and FIG. 4 is a graph useful in explaining the invention.

Referring to FIG. 1, there is illustrated a catalytic reactor 10 suitable for the production of ultra pure hydrogen by continuous hydrogen removal. While the present invention is suited for separating hydrogen from various gas mixtures containing hydrogen and other undesirable gases, as pointed out above, it will now be described specifically in connection with the improved method of separating hydrogen from gaseous mixtures, such as gaseous ammonia.

Gaseous ammonia at an elevated pressure P in the range of from about 50 to 400 p.s.i.g. or higher is introduced into the inlet 11 of the reactor 10 and flows downward in the direction of the arrow. The upper limit of the pressure is fixed only by the physical strength of the parts of the reactor. The reactor or cell 10 forming a zone has been schematically illustrated in FIG. 1 and includes a tubular portion 13, the opposite ends of which are provided with cover members 14 and 15. The cover members are held against the respective ends of the tubular member 13 by means of through bolts 16 and suitable gaskets 18 and 19 are utilized for preventing leakage of gas from the ends of the tubular member 13. While the tubular member 13 and the end covers 14 and 15 have been illustrated as being of electrically insulating material, such for example as ceramic, it is to be understood that other materials which have greater strength may be used, such for example as metal. The cover 14 in the tubular member 13 has been illustrated as ceramic material since the turns of the electrical heating coil 20 have been illustrated as engaging the inner surface of the tubular member 13 and the electrical connections 21 and 21' to the heating coil and have been diagrammatically illustrated as passing through the end cover 14.

The wires 21 and 21' are adapted to be connected to a suitable electrical power source for energizing the heating coil 20. The heating coil 20 is of sufficient capacity to raise the temperature of the gaseous ammonia, which may be preheated, entering the cell 10 through inlet 11 and passing around the incandescent heating coil 20 to a temperature $T_1$ of about 1000° F. The gaseous ammonia flows downward and around the incandescent heating coil 20 which is positioned between the inner surface of the containing tube 13 and the outer surface of a close-fitting porous ceramic member 22. The porous ceramic member 22 has been illustrated as a series of short tubular members or sections the ends of which are in close engagement effectively presenting a continuous tubular structure through the length of the heating coil 20. The ceramic tube or sleeve 22 is of porous structure impregnated with a suitable catalyst substance such as iron, nickel, platinum, or equivalent which is capable of causing the rapid dissociation of ammonia into $N_2$ and $H_2$. The sleeve 22 may also comprise a plurality of small catalyst beads arranged to form a tube. Disposed along the inside circumference of the porous catalytic sleeve 22 is relatively thin-walled palladium alloy tube 25, or equivalent, capable of selectively allowing only the transfer of hydrogen. The temperature of the gas mixture decreases as the ammonia is dissociated into $N_2+H_2$ and passes through the porous catalytic sleeve 22. The temperature of the hydrogen as it passes through the palladium alloy tube 24 has a temperature $T_2$ of approximately 800° F. to 1000° F.

As the gas mixture passes downward through the annular space containing the incandescent heating coil 20, the remaining ammonia is dissociated and the hydrogen is removed. Thus by the time the gas mixture has reached the bottom of the cell or reactor 10 essentially only nitrogen remains in the gas leaving the cell 10 through the outlet 27. The ultra pure hydrogen has passed through the wall of the palladium alloy tube 25 and leaves the cell 10 by way of the outlet 25a at the lower end of the tube. The ultra pure hydrogen leaving by way of outlet 25a is now available at a pressure $P_1$ somewhat below that of inlet pressure P of the gaseous ammonia. By using a high pressure ammonia feed, relatively high pressure ultra pure hydrogen can be produced.

The palladium alloy tube 25 may be made of silver-palladium or other equivalent material as disclosed in the aforesaid Patents 2,773,561 and 2,961,062. Additionally the tube 25, instead of being a single tube, may comprise a plurality of relatively thin-walled, straight, relatively small diameter palladium containing metal capillary tubes arranged in a cluster 25' as disclosed in FIG. 3 and also in the aforesaid Patent 2,961,062. The cluster of tubes 25' may be inserted in the position of tube 25 shown in FIG. 1. The lower ends of the tubes in the cluster 25' are sealed to each other but their bores are open and communicate with the outlet tube 25a'. The tubes are maintained in the cluster 25' by means of the ceramic elements 22, only two sections being shown, with a coupling means 30 for sealing the lower end of the cluster 25' to the conduit or outlet 25a' for the permeated ultra pure hydrogen.

The process of the present invention may be performed by other apparatus than that illustrated herein. For example, the heating coil 20 may be eliminated and the tube 25 used as the heating element by application thereto of a relatively high current at low voltage. More specifically in practicing the invention in one aspect thereof, electrical connections were made directly to the opposite ends of a thin-walled palladium-silver tube within a reactor or cell. A current of 20.8 amperes at 6.0 volts A.C. was passed through the tube raising the temperature of the tube to about 1000° F. to 1200° F. and concurrently heating catalyst beads which surrounded the tube. The beads were impregnated with 5% nickel from a nickel chloride solution. Gaseous ammonia at a flow rate of 160 cc./min. was passed into a cell containing the heated palladium-silver tube and the catalyst beads. A vacuum pump was connected to the open end of the tube and ultra pure hydrogen was withdrawn from the inside of the tube at a rate of 75 cc./min. The hydrogen was withdrawn from the tube as rapidly as it was dissociated and the residual component of the gaseous ammonia was separately withdrawn from the cell in a form substantially depleted of hydrogen.

The hydrogen transfer rates under various conditions are illustrated on the graph in FIG. 4 where the hydrogen transfer rate in cubic centimeters per minute has been plotted against powerstat setting. The following data show the voltage across the silver-palladium tube and current corresponding to each of the powerstat settings in the curves of FIG. 4.

| Powerstat Setting | Volts A.C. | Amperes |
|---|---|---|
| 20 | 1.2 | 5.5 |
| 30 | 1.9 | 7.6 |
| 40 | 2.6 | 9.9 |
| 50 | 3.3 | 12.0 |
| 60 | 4.0 | 14.1 |
| 70 | 4.6 | 16.4 |
| 80 | 5.4 | 18.6 |
| 90 | 6.0 | 20.8 |

It will be noted that the voltage and current increases with increase in powerstat setting. As the powerstat setting is increased, the temperature of the catalyst beads and the silver-palladium tube increases. This increase produces a higher hydrogen transfer rate.

Curve A shown in the graph in FIG. 4 shows the hydrogen transfer rate when the gas entering the cell is tank hydrogen. The silver-palladium tube was strung with one-quarter inch O.D. Harshaw Alumina Catalyst Pellets impregnated with 5% nickel from a nickel chloride solution. The curve B shows the removal of hydrogen when ammonia gas was introduced into the cell in place of tank hydrogen. At temperatures below the powerstat setting of 50, no hydrogen was present as a result of ammonia dissociation and thus none was removed by way of the silver-palladium tube. As the temperature within the cell was increased by increasing the powerstat setting, the hydrogen removal rate rises sharply as shown from curve B. At the powerstat setting of 90, the rate of hydrogen removal (75 cc./min.) was very nearly one half that obtained from the introduction of tank hydrogen. Assuming that ammonia is completely dissociated at the setting of 90, the gas mixture in the silver-palladium tube would be 75% hydrogen and 25% nitrogen. The curve C shows the results obtained when introducing ammonia gas into the silver-palladium tube but after removal of the aforementioned 5% Ni-Al$_2$O$_3$ catalyst beads from the Ag-Pd tube. From curve C it will be seen that the hydrogen removal rate is substantially zero thus illustrating that the ammonia does not dissociate to any extent on the heated tube itself. In all cases illustrated by curves A, B, and C of FIG. 4, the rate at which the gases were introduced into the tube were held approximately constant at 160 cc./min.

It is to be understood that the present invention is not limited to the specific apparatus described herein. The invention is adapted for use with other apparatus wherein the gaseous ammonia can be dissociated into a mixture of H$_2$ and N$_2$ with concurrent and continuous removal of the hydrogen. The present invention makes use of the unique combination of a catalyst suitable for the dissociation of ammonia and silver-palladium or other metal membrane permitting the continuous removal of hydrogen from the catalyst surface with the heat supplied to cause dissociation of the ammonia being available to properly activate the metal hydrogen transfer member. The present process additionally enables the reactor temperature to be markedly decreased over temperatures heretofore used since the equilibrium of the gaseous mixture is being continuously upset by the continuous removal of hydrogen.

The present invention is equally applicable to the steam reforming of methanol. The analogy to ammonia dissociation is illustrated by the following equations where Equation 2 is for methanol reforming and Equation 1 is for ammonia dissociation:

$$2NH_3 \rightleftharpoons 3H_2 + N_2 \quad (1)$$
$$CH_3OH + H_2O \rightleftharpoons 3H_2 + CO_2 \quad (2)$$

In the case of methanol reforming, Equation 2, the removal of H$_2$ is seen to be just as advantagous as with ammonia dissociation, Equation 1, since in each case two mols of gas give rise to four mols of products, each product including three mols of hydrogen. In this case of methanol reforming the mixture of steam and methanol at a temperature of about 600° F.–1000° F. enters the cell 10 through inlet 11, FIG. 1. The temperature of the cell and the gas mixture is maintained substantially uniform as the methanol is reformed into CO$_2$+H$_2$ and passes through the catalytic sleeve 22. The temperature of the hydrogen as it passes through the wall of the palladium alloy tube 24 has a temperature T$_2$ of approximately 600 F. to 1000° F.

From the foregoing equations it will be seen that both in the dissociation of ammonia and reforming of methanol no olefinic hydrocarbons can form and hence the process is operable. For carbon containing gases wherein the carbon containing molecule is comprised of more than one carbon atom such as in the case of ethane, propane, butane and higher members of the paraffin series or alcohols such as ethanol, propanol and higher members of the alcohol series the above process is rendered inoperable because of surface poisoning of the palladium and/or palladium alloy membrane in the cell by the chemisorption of the unsaturated or olefinic compounds resulting from catalytic dehydrogenation. The presence of gases containing sulfur atoms should also be avoided since chemical reaction with the palladium or palladium alloy will form metallic sulfides that result in surface poisoning and ultimate physical deterioration of the metal membrane.

In the production of ultra pure hydrogen from methanol there are certain advantages over the use of ammonia, particularly the fact that a lower temperature is required and methanol is easier to store because of its lower vapor pressure than liquid ammonia.

The present invention is also applicable to the steam reforming of methane in manner similar to that described above for methanol. Depending upon the amount of water used the equation for methane reforming may be written as:

$$CH_4 + H_2O \rightleftharpoons 3H_2 + CO \quad (3)$$

or as $$CH_4 + 2H_2O \rightleftharpoons 4H_2 + CO_2 \quad (4)$$

Thus it will be seen that in the case of methane reforming the removal of H$_2$ is just as advantageous as with either ammonia dissociation or methanol reforming. In Equation 3 it will be seen that the resulting product is three mols of hydrogen and one of carbon monoxide and in Equation 4 the resulting product is four mols of hydrogen and one of carbon dioxide.

What is claimed is:

1. The method of producing ultra pure hydrogen from a gas or gaseous mixture containing only in part hydrogen atoms and not more than one carbon atom per gaseous molecule comprising the steps of introducing the gas on one side only of a metal hydrogen transfer membrane within a diffusion zone, catalytically dissociating the gas or gaseous mixture in the zone into a mixture containing hydrogen as a separate component, maintaining a substantial pressure differential across said membrane sufficient to cause only said separate hydrogen component to pass through said membrane and thereby to remove the hydrogen from the zone in ultra pure form as rapidly as it is formed, and withdrawing the residual component of the original gas or gaseous mixture from the zone in a form substantially free of hydrogen.

2. The method of producing ultra pure hydrogen from a gas or gaseous mixture containing only in part hydrogen atoms and not more than one carbon atom per gaseous molecule comprising the steps of introducing the heated gas at a pressure above atmospheric on one side only of a metal hydrogen transfer membrane within a diffusion zone, passing the gas over a heated catalyst surface within said zone to dissociate the gas into a mixture containing hydrogen as a separate component, maintaining a substantial pressure differential across said membrane activated by the heat supplied for dissociation to cause only said separate hydrogen component to pass through said membrane and thereby to remove hydrogen from the zone in ultra pure form as rapidly as it is formed during the passage of the gas through the zone, and withdrawing the residual component of the original gas from said zone in a form substantially depleted of hydrogen.

3. The method of producing ultra pure hydrogen from a gas or gaseous mixture containing only in part hydrogen atoms and not more than one carbon atom per gaseous molecule comprising the steps of introducing the heated gas at a pressure in the range of about 50 to 400 p.s.i.g. on one side only of a metal hydrogen transfer membrane within a diffusion zone, passing the gas over a heated catalyst surface within said zone to dissociate the gas into a mixture containing hydrogen as a separate component, continuously passing only the separate hydrogen component through the metal hydrogen transfer membrane activated by the heat supplied for dissociation to remove the hydrogen from the zone in ultra pure form as rapidly as it is formed during the passage of the gas through the zone while withdrawing the residual component of the original gas from the zone in a form substantially depleted of hydrogen.

4. The method according to claim 3 wherein the gaseous mixture includes gaseous ammonia.

5. The method of producing ultra pure hydrogen from a gas or gaseous mixture substantially free of sulfur atoms and containing only in part hydrogen atoms and not more than one carbon atom per gaseous molecule comprising the steps of introducing the gas at a pressure above atmospheric on one side only of a metal hydrogen transfer membrane within a diffusion zone, heating the gas and concurrently passing it over a heated catalyst surface within the zone to dissociate the gas into a mixture containing hydrogen as a separate hydrogen component, maintaining a substantial pressure differential across said membrane sufficient to cause only said separate hydrogen component to pass through said membrane and thereby to remove the hydrogen from the zone in ultra pure form as rapidly as it is formed during the passage of the gas through the zone while separately withdrawing the residual component of the original gas from the zone in a form substantially depleted of hydrogen.

6. The method of producing ultra pure hydrogen from a gas or gaseous mixture containing only in part hydrogen atoms and not more than one carbon atom per gaseous molecule comprising the steps of introducing the gas at a pressure in the range of about 50 to 400 p.s.i.g on one side only of a metal hydrogen transfer membrane within a diffusion zone, heating the gas within the zone and concurrently passing the gas over a heated catalyst surface within the zone rapidly to dissociate the gas into a mixture containing hydrogen as a separate component, continuously passing only the separate hydrogen component through the metal hydrogen transfer membrane activated by the heat supplied for dissociation to remove the hydrogen from the zone in ultra pure form as rapidly as it is formed during the passage of the gas through the zone while withdrawing the residual component of the original gas from the zone in a form substantially depleted of hydrogen.

7. The method according to claim 6 wherein the gaseous mixture includes gaseous ammonia.

8. The method according to claim 6 wherein the gaseous mixture includes at least one gas from the group including ammonia, methane, methanol, carbon monoxide and carbon dioxide.

9. The method of producing ultra pure hydrogen from a gas or gaseous mixture containing only in part hydrogen atoms and not more than one carbon atom per gaseous molecule comprising the steps of introducing the gas on one side only of a metal hydrogen transfer membrane within a diffusion zone, catalytically dissociating the gas or gaseous mixture in the zone into a mixture containing hydrogen as a separate component, lowering the pressure on the side of said membrane opposite to the side exposed to the introduced gas to provide a substantial pressure differential across said membrane sufficient to cause only said separate hydrogen component to pass through said membrane and thereby to remove the hydrogen from the zone in ultra pure form as rapidly as it is formed, and withdrawing the residual component of the original gas or gaseous mixture from the zone in a form substantially free of hydrogen.

References Cited by the Examiner

UNITED STATES PATENTS

| | | |
|---|---|---|
| 1,124,347 | 1/1915 | Snelling. |
| 1,174,631 | 3/1916 | Snelling. |
| 1,685,759 | 9/1928 | Walter. |
| 1,736,065 | 11/1929 | Williams. |
| 1,826,974 | 10/1931 | Williams. |
| 1,935,675 | 11/1933 | Spalding. |
| 1,960,886 | 5/1934 | Woodhouse. |
| 2,699,986 | 1/1955 | Buell et al. _____ 23—212 |
| 3,102,003 | 8/1963 | Kummer _____ 23—212 X |
| 3,111,387 | 11/1963 | Avery et al. _____ 23—212 |
| 3,115,394 | 12/1963 | Gorin et al. _____ 23—212 |

FOREIGN PATENTS 579,535 7/1959 Canada.

BENJAMIN HENKIN, *Primary Examiner.*

MAURICE A. BRINDISI, *Examiner.*

E. STERN, *Assistant Examiner.*